United States Patent [19]
Davies

[11] 3,988,611
[45] Oct. 26, 1976

[54] DIRECT VOLTAGE POWER SUPPLY APPARATUS

[75] Inventor: Arthur Gordon Davies, London, England

[73] Assignee: Medical & Electrical Instrumentation Company Limited, London, England

[22] Filed: June 19, 1975

[21] Appl. No.: 588,392

[30] Foreign Application Priority Data
July 6, 1974  United Kingdom............... 30076/74

[52] U.S. Cl.......................... 250/207; 250/214 AG; 315/12 R; 323/18
[51] Int. Cl.²......................................... H01J 43/30
[58] Field of Search......... 250/207, 214 R, 214 AG, 250/213 VT; 323/18; 315/11, 12

[56] References Cited
UNITED STATES PATENTS

| | | | |
|---|---|---|---|
| 2,971,433 | 2/1961 | Akin ............................... | 250/207 X |
| 3,487,222 | 12/1969 | Martens .......................... | 250/214 R |
| 3,611,042 | 10/1971 | Boronkay........................ | 250/207 X |
| 3,653,763 | 4/1972 | Davies ............................. | 50/207 X |
| 3,680,957 | 8/1972 | Fukuda........................... | 250/207 X |
| 3,694,659 | 9/1972 | Ramsay et al................. | 250/213 VT |

*Primary Examiner*—Eugene La Roche
*Attorney, Agent, or Firm*—Edward F. Connors

[57] ABSTRACT

A direct current power supply circuit for a photomultiplier tube comprises a step-up transformer with a secondary winding connected to rectifier means feeding output terminals. The primary winding in series with a transistor switch is connected across a d.c. supply source and the switch is controlled by pulses from a pulse generator which is switched on to produce pulses and hence to switch current in the primary winding when a control signal opens a gate in a feedback circuit of the pulse generator. The control signal is derived from the photomultiplier circuit and the circuit operates with the gate opening and closing as necessary to obtain the required voltage. The control signal may be derived from across an anode resistor of the photomultiplier tube or across a resistor in series with the dynode resistor chain according to the characteristics required.

15 Claims, 6 Drawing Figures

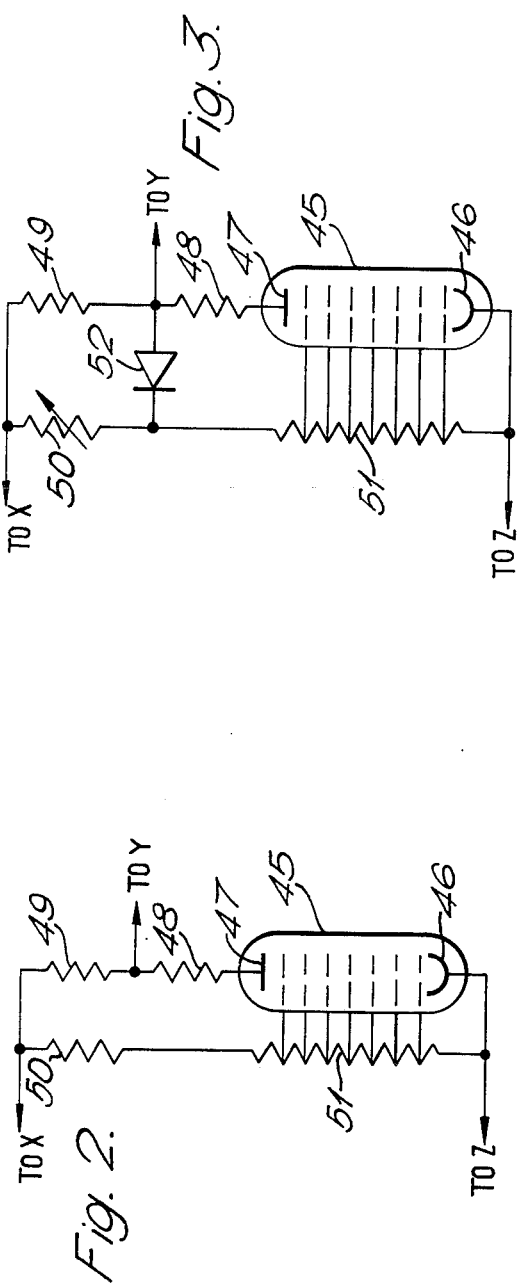

DIRECT VOLTAGE POWER SUPPLY APPARATUS

BACKGROUND OF THE INVENTION

This invention relates to direct current power supply circuits for photomultiplier tubes.

The power supply source of the present invention makes use of an inverter energised from a d.c. source and rectifier means for providing a high voltage supply for a photomultiplier tube. For some purposes, for example cathode ray tubes and electron microscopes, a power supply circuit is required to maintain a substantially stable high voltage. For photomultiplier tubes, however, it is often required that the voltage should be controlled in a manner dependent on the current drawn from the power supply circuit. Because of the wide range of magnitudes of the anode current and because of the voltage current characteristics required, the appropriate regulation of the voltage presents problems. In particular, the range of light intensity over which the tube will operate between the minimum at which a usable signal is obtained and the maximum when the tube saturates is restricted unless the supply voltage and particularly the dynode supply voltage is varied in accordance with the current. U.S. Pat. Nos. 2,971,433, 3,476,940 and 3,653,763 illustrate prior arrangements for providing a high voltage supply with suitable voltage/current characteristics.

SUMMARY OF THE INVENTION

It is one of the objects of the present invention to provide an improved form of power supply circuit for a photomultiplier tube, which circuit has relatively few components and may readily be arranged to provide either a stable voltage or a voltage controlled in a predetermined manner in accordance with the tube output current.

According to this invention, a photomultiplier tube direct current power supply circuit comprises an inverter energised from a d.c. source, rectifier means coupled to the inverter, to provide direct voltage across a pair of output terminals, and circuit means connecting the output terminals to the photomultiplier tube, wherein the inverter comprises a pulse generator having switch means operative to inhibit pulse generation when the voltage across part of a potential divider circuit across said output terminals exceeds a predetermined value. The switch means conveniently comprises a gate arranged in a feedback loop for the pulse generator for interrupting the feedback. The gate may be arranged to operate when the voltage across a resistor in a circuit fed from the rectifier exceeds a reference voltage derived from the d.c. supply source. If a stable output voltage is required, the gate may be controlled by means of a voltage across a resistor in a potentiometer network connected across the rectifier output so that, when the output voltage exceeds a predetermined value, the gate is open to interrupt the feedback path and thereby prevent pulses being generated. The output voltage across said output terminals (which may have a smoothing capacitance across them) will then tend to fall as power is drawn from the circuit and, when it has fallen sufficiently, the gate will be opened to restart generation of pulses causing the voltage to build up again.

Considering the overall operation with a steady drain on the output terminals, the gate is held sometimes open and sometimes closed, the control potential applied to the gate being close to the critical value. These pulses are generated or not as necessary to maintain the output voltage at the required value. If the drain on the output increases so that the output potential at these terminals tends to fall more rapidly, then pulses are generated at greater average rate and vice-versa. With this circuit however, the potential at the output terminals can be readily controlled by using a current dependent control for the potential at the gate. To maintain the control potential at the critical value with changing output load current, the output voltage must change with the load. It will thus be apparent that, if the potential divider circuit includes the load or part of the load, the output potential can be made to depend on the current drawn by the load. As will be described in further detail later, it becomes readily possible, with this circuit, to obtain the voltage/current characteristics required for the supply to a photomultiplier tube.

The inverter circuit may include a transformer. Conveniently a primary winding of a transformer is connected in series with a switching transistor across said d.c. source and the output of the pulse generator is applied as a switch control signal to said switching transistor. The transformer may have a secondary winding connected to a full wave rectifier constituting said rectifier means and a smoothing capacitance across said output terminals. By using a suitable turns ratio for the transformer and by having an adequately steep rise time for the generated pulses used as the switch control signal, it is readily possible to produce the high voltage required for a photomultiplier tube.

The aforementioned potentiometer network may include an adjustable resistor enabling the output voltage to be adjusted.

In using this direct current power supply circuit for providing a direct voltage supply for a photomultiplier tube, the anode to cathode circuit in the photomultiplier tube may be connected in series with an anode load resistor or resistors to form said potential divider circuit across the rectified output and the dynode resistor chain in series with a further resistor may also be connected across this rectified output. The voltage developed across an anode load resistor in the potential divider in series with the anode/cathode circuit may be applied to said gate. If the circuit includes a transformer, one of the output terminals may be connected to one of the terminals of the d.c. supply source so that the voltage across the anode load resistor which is used for controlling the pulse generation is a voltage with respect to a datum potential represented by the potential at one of the terminals of the d.c. supply source.

Such an arrangement having an anode load resistor or resistors in series with the photomultiplier tube to form the potential divider serves to maintain a substantially constant anode current for the tube and the power supply is thus self-regulating with respect to the requirements of the photomultiplier tube, the anode current being maintained irrespective of the amount of light falling on the photo cathode. The voltage across the tube may be used as a measure of the light intensity.

If the photomultiplier tube has a low dark current, in the absence of radiation, the power supply circuit will tend to produce a high voltage across the tube and, to prevent this voltage exceeding the safe operating potential of the tube, a further potential divider network may be connected across the output of the power supply circuit with a diode between the anode of the tube and a tap on said further potential divider network or, more generally, between a tap on a potential divider in series with the anode and a tap on the further potential divider network to limit the anode voltage of the tube. The further potential divider network may conveniently comprise the dynode resistors together with a further series resistor or resistors.

It is well-known to operate photomultiplier tubes in one or other of two modes. It is required sometimes to have an output varying linearly with respect to logarithmic variations in light level when using the photomultiplier tube to measure optical densities in such instruments as densitometers and colour analysers. On the other hand it is also required at times to have the output varying linearly with respect to linear variations in light level when the photomultiplier tube is used for example for the measurement of light for photographic exposure purposes. Control of the output voltage of the power supply circuit making use of a tap on a potential divider in series with the anode gives a reasonable approximation to the desired linear-log operation. Linear-linear operation may be achieved by taking the control for the gate from a tap on a resistive potential divider across the output terminals. Switch means may be provided for connecting the aforementioned gate alternatively either to a tap on a potential divider in series with the anode or to a tap on a resistive potential divider across the output terminals whereby switching may be effected from the linear-log mode to a linear-linear mode. The resistive potential divider across the output terminals may comprise the dynode resistor chain together with one or more further resistors. In using the photomultiplier tube for photographic exposure control, an integrator may be connected in series with the anode circuit for integrating the anode current, the output of the integrator being applied to a level detector controlling switching means for determining the exposure.

BRIEF DESCRIPTION OF THE DRAWINGS

FIGS. 2, 3, 4 and 5 are diagrams each illustrating a photomultiplier tube with an associated control network for use with the power supply circuit of FIG. 1; and FIG. 6 illustrates a modification of the power supply circuit of FIG. 1.

DESCRIPTION OF THE PREFERRED EMBODIMENTS

Figure 1:
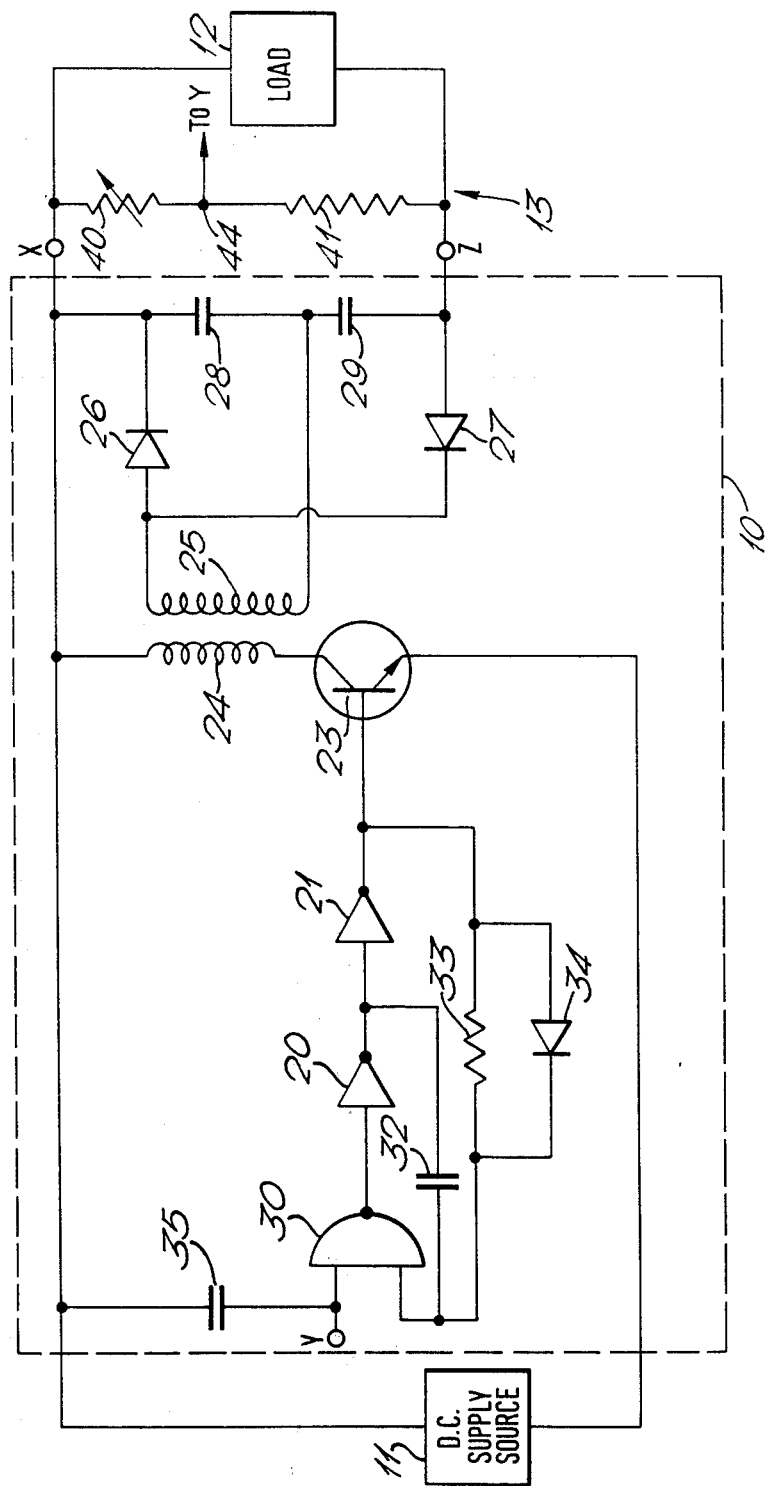
FIG. 1 is a circuit diagram showing a direct current power supply circuit with a resistive potential divider control network for supplying a constant voltage to a load.

Referring to FIG. 1 there is shown a direct current power supply circuit 10 energised from a d.c. supply source 11 and feeding a load 12 having associated control network 13 for controlling the power supply unit 10 so that a constant voltage is applied to the load.

The power supply unit 10 comprises essentially a pulse generator, to be described in further detail later, and having two inverting amplifier stages 20, 21, the output of which is applied as a switching voltage to a transistor 23 connected in series with a primary winding 24 of a transformer. This primary winding 24 with the series switching transistor 23 is connected across the d.c. supply source 11. The switching on and off of the d.c. supply through the primary winding 24 of the transformer produces pulses in a secondary winding 25 which are rectified by a full wave rectifier system comprising rectifiers 26, 27 and smoothing capacitors 28, 29 to give the required d.c. output voltage across terminals X, Z.

Control of the output voltage is effected by switching on and off the oscillator and for this purpose a NAND gate 30 is provided in a feedback loop of the pulse generator, the gate essentially serving to open a feedback circuit to the first amplifier stage when the input control voltage at a terminal Y of the gate 30 exceeds a predetermined level. The pulse generator circuit has a capacitive feedback 32 from the output of the first stage inverting amplifier 20 and a resistive feedback 33 from the output of the second stage inverting amplifier 21, the feedback signals being applied through the aforementioned gate 30 to the first stage inverting amplifier 20. The resistive feedback 33 is shunted by a diode 34.

The circuit is arranged to give short duration pulses with a short rise time. The short duration minimises th current drain from source 11. The rapid rise of the pulse applied to the switching transistor 23, together with appropriate choice of the transformer turns ratio, enables the required high voltage for a photomultiplier tube to be produced across terminals XZ. The feedback elements 32, 33, 34 essentially determine the pulse form, in particular, the pulse rise time and pulse duration. However, in operation, pulse repetition is dependent on the gate 30 being open. This gate is controlled by an applied control voltage at Y and thus the average pulse repetition rate depends on this control voltage. The manner of deriving the control voltage will be described later. A capacitor 35 is provided between terminal Y and one side of the supply source 11 for introducing into the control circuit a time constant longer than the pulse repetition period of the pulses produced by the circuit.

For supplying a constant voltage to a load, a potential divider network 40, 41 is connected across the output terminals X, Z in parallel with the load 12. To adjust this output voltage, resistor 40 is made adjustable. A tap 44 between resistors 40, 41 is connected to the aforementioned terminal Y at the input to the gate 30. The voltage across part of the potential divider network 40, 41 is thus applied as the gate control voltage. Terminal X is connected to the end of primary winding 24 remote from transistor 23, i.e. to the end of the winding connected to the d.c. supply source 11 so that the voltage developed across resistor 40 is a voltage with respect to a datum provided by source 11. If this voltage across resistor 40 increases to such a level that the gate 30 is closed, the feedback circuit is broken, pulse generation stops and the output voltage across the terminals X, Z will start to fall. The sample portion of this voltage at Y used as the control voltage will thus decrease and the gate 30 will then be opened so that pulse generation recommences. The voltage rapidly builds up in a few cycles and so increases the voltage across X, Z until equilibrium is re-established. The pulse generator thus works in a series of bursts to give a controlled d.c. output voltage across the terminals X, Z. Adjustment of the resistor 40 will set the output level.

In overall operation, the potential at Y is held close to the critical value at which the gate 30 switches from the open to closed state or vice-versa. The gate is sometimes open and sometimes closed so that pulses are generated or not as necessary to maintain the voltage across terminals XZ and hence the control voltage at Y at this constant critical value. The circuit thus serves to maintain the output voltage across the load constant.

The load 12 may be a photomultiplier tube with an anode series resistor connected to terminal X and the cathode connected to terminal Z. If constant voltage operation is required, the divider circuit 40, 41 might be constituted either by a separate potential divider, as in FIG. 1, or by the dynode resistor chain with one or more further series resistors.

However as mentioned previously, the power supply circuit of the present invention finds particular utility in providing specific voltage/current characteristics such as are required for the power supply for a photomultiplier tube. One such arrangement is illustrated in FIG. 2 where there is shown a photomultiplier tube 45 having a cathode 46 which is connected to the terminal Z of the power supply unit and having an anode 47 connected in series with resistors 48, 49 forming a potential divider, the end of this potential divider 48, 49 remote from the anode 47 being connected to the terminal X. The photomultiplier tube has a dynode supply resistor network comprising a resistor 50 in series with the chain of resistors 51 providing the voltage supplies for the dynodes.

Assuming a fixed amount of light falls on the photomultiplier tube cathode 46 and the d.c. power supply is switched on, the pulse generation will start up and so provide voltage supplies to the dynodes and a flow of anode current through the photomultiplier tube. The voltage drop across the resistor 49 in the potential divider 48, 49 will cause the gate 30 to be closed and the pulse generation to cease when the voltage developed by the power supply gives rise to a certain anode current in the photomultiplier tube. If the output voltage decreases a little, the reduction in anode current will cause the gate to open and the pulse generation to start up again. The circuit therefore operates to maintain the anode current supply current constant. If the amount of light is decreased, the pulse generator will come on for longer periods of time to maintain equilibrium. Similarly if the amount of light increases, the pulse generator will come on for shorter periods of time. The power supply is thus self-regulating with respect to the requirements of the photomultiplier tube 45 and serves to maintain the anode current at the required level. The voltage across the photomultiplier tube 45 varies in accordance with the light level and, if the tube is for measuring light level, a suitable measuring circuit (not shown) may be provided for measuring the voltage across the tube. The arrangement thus is suitable for enabling light or radiation intensity measurements to be effected over a wide dynamic range. The circuit is thus suitable for use as part of a colour analysing instrument in photography or densitometer or spectrophotometer where it is required to measure radiation intensity.

If the photomultiplier tube has a low dark current, in the absence of any radiation, the power supply circuit might generate a voltage exceeding the safe operating potential of the tube or possibly of the transformer or capacitors or rectifiers in the power supply circuit. FIG. 3 illustrates a modification of the arrangement of FIG. 2 for limiting the maximum dynamic range of operation. In FIG. 3 the same reference characters are used as in FIG. 2 to indicate corresponding components and reference will be made only to the distinctive features of FIG. 3. In FIG. 3 a diode 52 is connected between the tapping point on the potential divider 48, 49 and a point on the dynode resistor supply network 50, 51. This supply network, in FIG. 3, has an adjustable resistor 50 in place of the fixed resistor shown in FIG. 2. The limiting or stabilising action is provided by the potential divider network comprising the resistor 50 and dynode resistor chain 51 which in effect form a control network similar to the network 40, 41 shown in FIG. 1; the diode 52 ensures that the oscillator is switched off when the output voltage of the power supply circuit across terminals X, Z exceeds a predetermined value. The adjustable resistor 50 may be set so that this diode 52 provides the switching action at the critical point where the light incident on the photomultiplier tube cathode 46 would be such as to make the power supply give an excessively high voltage. As soon as the diode 52 becomes conductive, the pulse generator switches off and thus the supply voltage is limited.

In measuring intensity of radiation, for many purposes it is desired to express the results in terms related to optical density. Optical density is the logarithm of the reciprocal of the transmittivity and, for this reason, it is often desirable to have an output measurement on a display having a linear scale representative of the logarithm of the measured radiation. The power supply circuit of the present invention may readily be utilised in operating a photomultiplier tube so as to give an output which changes linearly with respect to a logarithmic variation in light level. Each of FIGS. 4 and 5 illustrate a circuit arrangement of a photomultiplier tube for connection to the terminals X, Y and Z of the d.c. power supply unit of FIG. 1 and in which switch means are incorporated to enable either a linear-log output to be obtained, as is required in measurements of optical densities in such instruments as densitometers and colour analysers or alternatively to obtain a linear-linear output, that is to say an output that varies linearly with respect to linear variations in light level, such as is required for direct use for measurement and control of photographic exposure.

Figure 4:
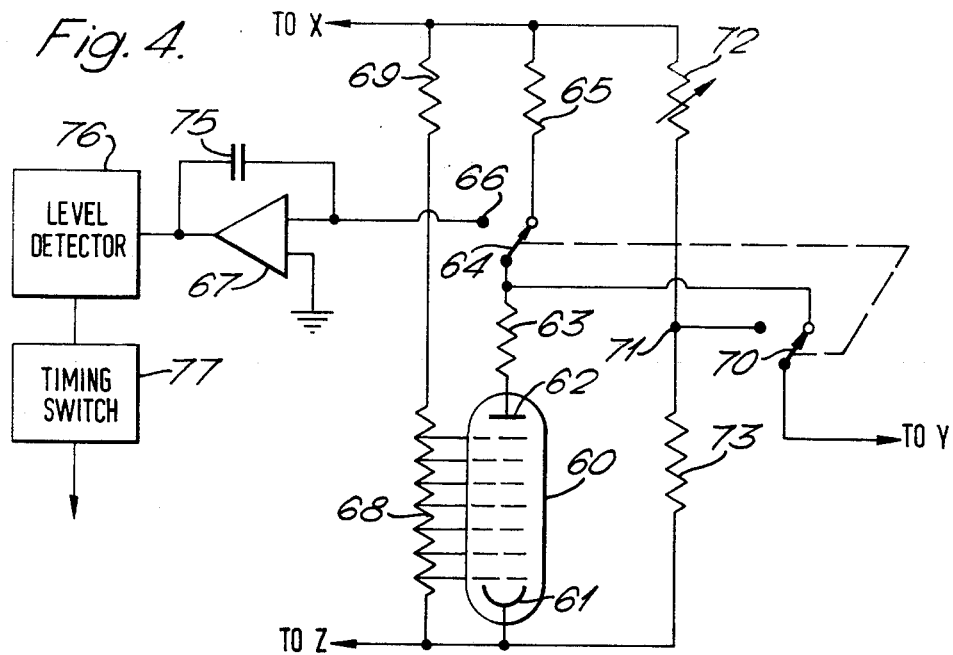

Referring to FIG. 4 there is shown a photomultiplier tube 60 having its cathode 61 connected to the terminal Z of the power supply unit and having its anode 62 connected via a series resistor 63 to one pole 64 of a two-pole two-way switch enabling the anode resistor 63 to be connected either in series with a further resistor 65 and thence to the terminal X of the power supply unit or alternatively to be connected to a contact 66 connected to the input terminal of an integrating operational amplifier 67. The photomultiplier tube has a dynode resistor chain 68 connected in series with a fixed resistor 69 to form a network across the terminals Z, X. The end of the resistor 63 remote from the anode, when it is connected by pole 64 in series with the resistor 65 is also connected by a second pole 70 of the switch to the terminal Y on the gate 30 of the power supply unit. The pole 70 in the alternative switch position connects the terminal Y to a tap 71 on the divider network across the terminals X, Z comprising an adjustable resistor 72 and a fixed resistor 73. With the switch poles 64, 70 in the position shown in the drawing, the photomultiplier tube 60 is operated in a linear-log mode; light falling on the photomultiplier cathode 61 controls the voltage of the power supply in the manner described with reference to FIG. 2. In the alternative position of the double pole switch, the photomultiplier tube 60 operates on a fixed but predetermined E.H.T. voltage determined by the potential difference between the potential at terminal Z and the datum potential of the operational amplifier 6, which datum potential conveniently may be earth as shown in FIG. 4. The terminal X may likewise be earthed. In this arrangement, the anode current of the photomultiplier tube 60 is integrated by the integrator which has an integrating capacitor 75. The output of the integrator is typically applied to a level detector 76 controlling timing switch means 77 for effecting correct exposure when the photomultiplier is used as an exposure time control. In the known way means (not shown) may be provided for setting the integrator 76 to zero or to an arbitrary preset level before commencing the timing operation.

With the arrangement of FIG. 4, it is readily possible to obtain the required characteristic matching the time/light intensity requirement of a photo-sensitive material. Adjustment of the voltage from the photomultiplier tube is possible by adjustment of resistor 72 and/or integrating operation can be adjusted by adjusting capacitor 75 or by altering the setting of the level detector 76.

Figure 5:
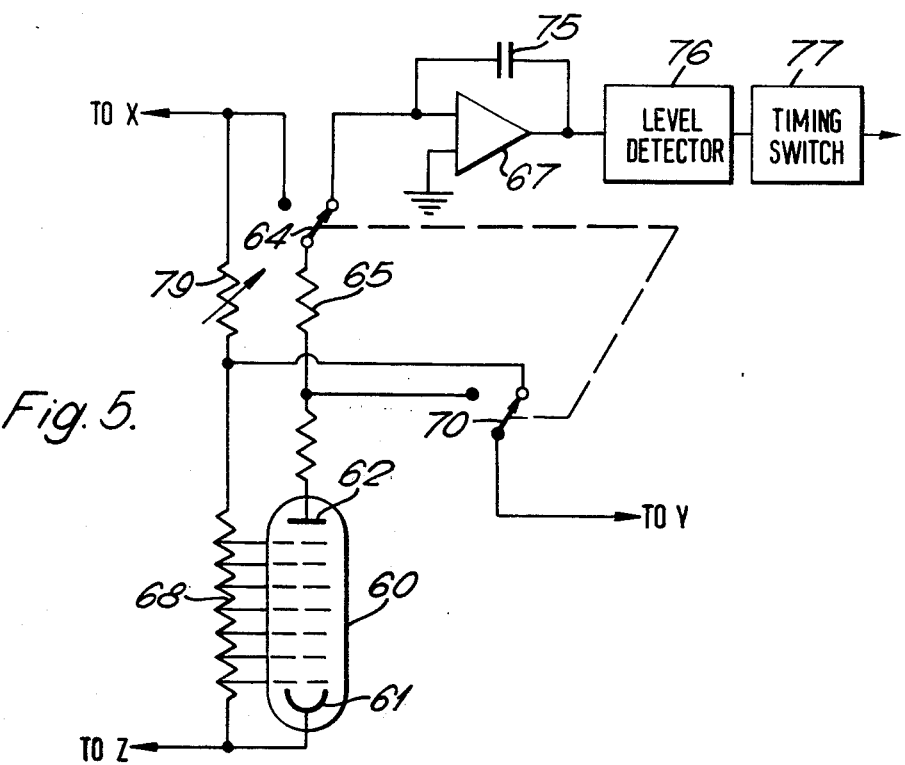

FIG. 5 illustrates a modification of the arrangement of FIG. 4 in which the same reference numerals are used to indicate corresponding components. In FIG. 5, the dynode resistor chain 68 is used in conjunction with an adjustable resistor 79 as the voltage sensor resistor in the linear-linear mode instead of providing a separate potential divider network as in the arrangement of FIG. 4.

FIG. 6 illustrates a modification of the power supply unit of FIG. 1. In FIG. 6 the same reference characters are used as in FIG 1 for corresponding components and reference will be made only to the distinctive features of FIG. 6. In the arrangement of FIG. 6, three inverting amplifier stages 80, 81, 82 are employed in the pulse generator. Capacitive feedback by means of a capacitor 84 is provided from the output of stage 81 to the input of stage 80 and resistive feedback by a resistor 85 is provided from the output of stage 82 to the input of stage 80. Positive feedback is provided by a connection 86 from the output of stage 81 to the NAND gate 30 and the output from the gate 30 is applied via a diode 87 to the input of stage 80. In the arrangement of FIG. 6, the pulses will be produced only when there is positive feedback on lead 86 and hence the gate 30 serves as before to enable the pulses to be switched on and off in accordance with the level of the input control signal at terminal Y.

The FIG. 6 arrangement, compared with FIG. 1, admits of a greater range of control characteristic variation and thus can be used, without modification, with a wider variation of photomultiplier tubes. With some tubes, a voltage variation from 200 to 1200 V may be required. For a low voltage at high light intensity, the pulse repetition rate becomes very low; but the circuit of FIG. 6 can give stable operation even under these conditions.

The circuits described above conveniently can be made using CMOS devices but other types of gates, inverters and switching devices may be employed. Some or all of these devices may be part of a monolithic chip or formed as thin or thick film hybrid circuits.

I claim:

1. A photomultiplier tube direct current power supply circuit comprising a d.c. source, an inverter energized from said d.c. source, a pair of output terminals, rectifier means coupled to the inverter to provide a direct voltage across said pair of output terminals, a photomultiplier tube, circuit means connecting said output terminals to said photomultiplier tube and a potential divider circuit across said output terminals having a tap at which a voltage is produced, and wherein said inverter comprises a pulse generator having a chain of inverters with a feedback circuit and voltage-controlled switch means operative to inhibit pulse recurrence when a control voltage applied to said switch means exceeds a predetermined value and means applying said voltage from the potential divider circuit to said switch means as said control voltage whereby pulse generation is inhibited when the voltage across said output terminals exceeds a predetermined level.

2. A photomultiplier tube power supply circuit as claimed in claim 1 wherein there is provided a dynode resistor chain in series with a further resistor connected across said output terminals to form said potential divider circuit.

3. A photomultiplier tube power supply circuit as claimed in claim 1 and including a step-up transformer having primary and secondary windings, a switching transistor connected in series with said primary winding across said d.c. source and wherein said rectifier means are coupled to said secondary winding and wherein said switch control voltage is applied to said switching transistor.

4. A photomultiplier tube power supply circuit as claimed in claim 3 wherein said secondary winding is connected to a full wave rectifier constituting said rectifier means and wherein a smoothing capacitance is connected across said output terminals.

5. A photomultiplier tube power supply circuit as claimed in claim 1 wherein said pulse generator includes a feedback loop and wherein said switch means comprise a gate arranged in said feedback loop for the pulse generator for interrupting the feedback.

6. A photomultiplier tube power supply circuit as claimed in claim 5 and wherein a resistor forming part of said potential divider is connected between one of the output terminals and the remainder of said potential divider circuit, the end of the resistor remote from said one output terminal being connected to said gate, said one output terminal being connected so as to be at the same potential as one terminal of the d.c. supply source.

7. A photomultiplier tube power supply circuit as claimed in claim 5 wherein the potential divider circuit is formed by said photomultiplier tube connected in series with an anode load resistor across the output terminals, said tap on said potential divider network being connected to a control input of said gate.

8. A photomultiplier tube direct current power supply circuit comprising a d.c. source, a transformer having a primary and a secondary winding, a switching transistor connected in series with said primary winding and said d.c. source, rectifier means connected across said secondary winding and including a pair of output terminals for the rectified voltage, a pulse generator producing control pulses and having a chain of inverters and a feedback circuit including a gate controllable by a control signal and operative when the control signal amplitude exceeds a predetermined level to inhibit pulse generation by the pulse generator, means applying said control pulses to said switching transistor to make the latter conductive during each control pulse, a photomultiplier tube having a cathode and an anode, an anode resistor connecting said anode to one of said output terminals, means connecting the cathode to the other of said output terminals, the end of the primary winding connected to the d.c. source being connected also to said one of the output terminals, and circuit means applying a voltage derived from said anode resistor to said gate as a control signal.

9. A photomultiplier tube power supply circuit as claimed in claim 8 wherein said chain inverters comprises three inverters with capacitive feedback across two successive inverters in the chain and resistive feedback across three inverters.

10. A photomultiplier tube power supply circuit as claimed in claim 8 wherein the photomultiplier tube has a dynode resistor chain connected in series with a further resistor across said output terminals.

11. A photomultiplier tube power supply circuit as claimed in claim 10 wherein said furhter resistor is adjustable.

12. A photomultiplier tube power supply circuit as claimed in claim 10 wherein a diode is connected between the junction between said further resistor and said dynode resistor chain and the input to said gate with a polarity such as to inhibit operation of the pulse generator when the voltage across the further resistor reaches a predetermined value.

13. A photomultiplier tube power supply circuit as claimed in claim 10 and further having switch means to connect the input to said gate alternatively either to the potential divider in series with the anode circuit or to the junction between said further resistor and said dynode resistor chain.

14. A photomultiplier tube power supply circuit as claimed in claim 10 and having a further potential divider including an adjustable resistor across the output of said rectifier means wherein switch means are provided for connecting said gate alternatively to a tap on said potential divider in series with the anode of the photomultiplier tube or to a tap on said furhter potential divider.

15. A photomultiplier tube power supply circuit as claimed in claim 10 and having an integrating circuit, switch means arranged for optionally connecting said integrating circuit in series with the anode supply of the photomultiplier tube to integrate the anode supply current or alternatively connecting the anode resistor to said one of the output terminals and wherein timing means are provided controlled by the output of said integrating circuit.

* * * * *